(12) United States Patent
Qiu et al.

(10) Patent No.: US 11,402,012 B2
(45) Date of Patent: Aug. 2, 2022

(54) HEAT EXCHANGE DEVICE WITH SHAPE MEMORY ALLOY SPRING

(71) Applicant: Zhejiang Sanhua Automotive Components Co., Ltd., Zhejiang (CN)

(72) Inventors: Haoming Qiu, Zhejiang (CN); Xiaojun Qian, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 177 days.

(21) Appl. No.: 16/649,093

(22) PCT Filed: Oct. 17, 2018

(86) PCT No.: PCT/CN2018/110605
§ 371 (c)(1),
(2) Date: Mar. 19, 2020

(87) PCT Pub. No.: WO2019/080757
PCT Pub. Date: May 2, 2019

(65) Prior Publication Data
US 2020/0224759 A1    Jul. 16, 2020

(30) Foreign Application Priority Data
Oct. 23, 2017  (CN) .......................... 201710992920.X

(51) Int. Cl.
| *F16H 57/04* | (2010.01) |
| *F01M 5/00* | (2006.01) |
| *F28D 21/00* | (2006.01) |

(52) U.S. Cl.
CPC ..... *F16H 57/0413* (2013.01); *F16H 57/0417* (2013.01); *F01M 5/002* (2013.01);
(Continued)

(58) Field of Classification Search
CPC .. F01M 5/002; F01M 5/007; F01M 2005/004; F16H 57/0413; F16H 57/0417;
(Continued)

(56) References Cited

U.S. PATENT DOCUMENTS

| 5,188,287 A * | 2/1993 | Chamot ............... G05D 23/022 |
| | | 236/DIG. 2 |
| 6,929,187 B2 * | 8/2005 | Kempf .................... E03B 7/045 |
| | | 236/12.11 |

(Continued)

FOREIGN PATENT DOCUMENTS

| CN | 101484728 A | 7/2009 |
| CN | 101535914 A | 9/2009 |

(Continued)

OTHER PUBLICATIONS

International Search Report and Written Opinion for International Application No. PCT/CN2018/110605, dated Jan. 4, 2019.

(Continued)

*Primary Examiner* — Ljiljana V. Ciric
(74) *Attorney, Agent, or Firm* — Wolf, Greenfield & Sacks, P.C.

(57) ABSTRACT

A heat exchange device includes a heat exchanger body and a thermostatic assembly; the heat exchanger body includes a first passage, one end of the first passage is in communication with the fluid inlet of the heat exchanger body, at least part of the thermostatic assembly is arranged in the first passage, the thermostatic assembly comprises a valve body provided with a valve chamber, the valve body is provided with an inlet, a first outlet, and a second outlet which are all in communication with the valve chamber; a return spring, a shape memory alloy spring, and a valve sleeve are provided in the valve chamber, the valve sleeve is slidable back and forth in an axial direction, the shape memory alloy spring is made of a memory alloy material, and the return (Continued)

spring and the shape memory alloy spring are respectively located on two sides of the valve sleeve.

18 Claims, 6 Drawing Sheets

(52) U.S. Cl.
CPC ..... *F01M 5/007* (2013.01); *F28D 2021/0089* (2013.01); *F28F 2250/06* (2013.01)

(58) Field of Classification Search
CPC ............... F16K 11/0716; F16K 31/002; F28D 2021/0089; F28D 9/005; F28F 2250/06; F28F 27/02
See application file for complete search history.

(56) References Cited

U.S. PATENT DOCUMENTS

| | | | | |
|---|---|---|---|---|
| 7,073,528 B2* | 7/2006 | Kempf | ............... | E03B 7/045 122/13.3 |
| 7,140,382 B2* | 11/2006 | Kempf | ............... | E03B 7/045 137/337 |
| 7,287,707 B2* | 10/2007 | Kempf | ............... | E03B 7/045 236/12.13 |
| 7,407,113 B2* | 8/2008 | Guterman | ............... | E03C 1/041 137/613 |
| 7,648,078 B2* | 1/2010 | Kempf | ............... | F24D 17/0078 236/12.13 |
| 7,874,498 B2* | 1/2011 | Kempf | ............... | F16K 31/002 236/12.13 |
| 7,971,601 B2* | 7/2011 | Lum | ............... | G05D 23/02 137/337 |
| 8,091,793 B2* | 1/2012 | Kempf | ............... | G05D 23/022 236/12.13 |
| 8,210,441 B2* | 7/2012 | Kempf | ............... | G05D 23/12 236/12.13 |
| 8,434,510 B2* | 5/2013 | Lum | ............... | F16K 31/002 137/337 |
| 8,505,830 B2* | 8/2013 | Kempf | ............... | E03B 7/045 236/12.13 |
| 8,714,236 B2* | 5/2014 | Karamanos | ............... | F28F 9/0246 165/11.1 |
| 8,820,652 B2* | 9/2014 | Kempf | ............... | G05D 23/12 236/12.13 |
| 8,820,653 B2* | 9/2014 | Kempf | ............... | F24D 17/0078 236/12.13 |
| 9,170,584 B2* | 10/2015 | Lum | ............... | F16K 31/002 |
| 9,334,946 B1 | 5/2016 | Mason | | |
| 9,487,890 B1* | 11/2016 | Farrell | ............... | B64D 17/18 |
| 9,534,701 B2* | 1/2017 | Gano | ............... | E21B 34/06 |
| 9,639,095 B2* | 5/2017 | Schurle | ............... | E03C 1/04 |
| 9,694,452 B2* | 7/2017 | Karamanos | ............... | F24F 5/0003 |
| 9,727,062 B2* | 8/2017 | Kocurek | ............... | G05D 23/025 |
| RE46,708 E* | 2/2018 | Karamanos | ............... | F24F 1/032 |
| 9,989,322 B2* | 6/2018 | Cheadle | ............... | F01N 5/02 |
| 10,066,756 B2* | 9/2018 | Sohn | ............... | F16K 31/002 |
| 10,767,893 B2* | 9/2020 | Karamanos | ............... | B23P 15/26 |
| 2002/0062867 A1* | 5/2002 | Kempf | ............... | G05D 23/134 137/334 |
| 2005/0242198 A1* | 11/2005 | Kempf | ............... | E03B 7/09 236/12.11 |
| 2005/0242199 A1* | 11/2005 | Kempf | ............... | G05D 23/134 236/12.11 |
| 2006/0049267 A1* | 3/2006 | Lum | ............... | G05D 23/022 236/12.13 |
| 2006/0108435 A1 | 5/2006 | Kozdras et al. | | |
| 2007/0075152 A1* | 4/2007 | Guterman | ............... | E03C 1/041 236/93 R |
| 2007/0114290 A1* | 5/2007 | Kempf | ............... | F16K 31/002 236/12.13 |
| 2007/0137709 A1* | 6/2007 | Kempf | ............... | E03B 1/048 137/337 |
| 2007/0278318 A1* | 12/2007 | Kempf | ............... | F16K 31/002 236/12.11 |
| 2008/0164006 A1* | 7/2008 | Karamanos | ............... | F28F 9/002 165/67 |
| 2009/0007972 A1* | 1/2009 | Lum | ............... | G05D 23/02 137/468 |
| 2009/0026405 A1 | 1/2009 | Sheppard et al. | | |
| 2009/0320642 A1 | 12/2009 | Führer et al. | | |
| 2010/0096025 A1* | 4/2010 | Kempf | ............... | G05D 23/022 137/337 |
| 2011/0132989 A1* | 6/2011 | Kempf | ............... | E03B 7/09 236/12.11 |
| 2012/0168113 A1* | 7/2012 | Karamanos | ............... | F24F 1/26 165/11.1 |
| 2012/0222757 A1* | 9/2012 | Kempf | ............... | E03B 7/045 137/337 |
| 2012/0247582 A1 | 10/2012 | Lamb et al. | | |
| 2012/0325918 A1* | 12/2012 | Kempf | ............... | G05D 23/12 236/12.13 |
| 2013/0015376 A1* | 1/2013 | Kocurek | ............... | E21B 41/0007 251/11 |
| 2013/0160972 A1 | 6/2013 | Sheppard et al. | | |
| 2013/0228307 A1 | 9/2013 | Kanzaka et al. | | |
| 2013/0240053 A1* | 9/2013 | Lum | ............... | G05D 23/02 137/115.01 |
| 2013/0299010 A1* | 11/2013 | Kempf | ............... | G05D 23/134 137/337 |
| 2013/0327287 A1 | 12/2013 | Kim et al. | | |
| 2014/0150739 A1 | 6/2014 | Kim et al. | | |
| 2014/0246173 A1* | 9/2014 | Cheadle | ............... | F02M 26/26 165/103 |
| 2014/0325844 A1* | 11/2014 | Karamanos | ............... | F24F 5/0003 29/890.03 |
| 2015/0211395 A1 | 7/2015 | Gooden | | |
| 2016/0153575 A1* | 6/2016 | Sohn | ............... | F03G 7/065 310/306 |
| 2017/0227250 A1* | 8/2017 | Karamanos | ............... | F24F 1/0063 |
| 2019/0284975 A1* | 9/2019 | Saupe | ............... | B01D 35/18 |
| 2020/0224759 A1* | 7/2020 | Qiu | ............... | F16H 57/0417 |
| 2020/0293071 A1* | 9/2020 | Qiu | ............... | F16K 11/02 |
| 2020/0355394 A1* | 11/2020 | Karamanos | ............... | F24F 5/0003 |

FOREIGN PATENT DOCUMENTS

| | | | | |
|---|---|---|---|---|
| CN | 101802469 A | 8/2010 | | |
| CN | 103210275 A | 7/2013 | | |
| CN | 103486884 A | 1/2014 | | |
| CN | 103851938 A | 6/2014 | | |
| CN | 104806739 A | 7/2015 | | |
| CN | 205580255 U | 9/2016 | | |
| DE | 10 2004 050 877 A1 | 4/2006 | | |
| DE | 10 2006 052 296 A1 | 3/2008 | | |
| DE | 10 2007 058 160 B3 | 5/2009 | | |
| DE | 10 2012 113 111 A1 | 12/2013 | | |
| GB | 2506791 A * | 4/2014 | ........... | F16K 31/002 |
| GB | 2506791 B * | 6/2017 | ......... | E21B 41/0007 |
| JP | H01-032407 U | 3/1989 | | |
| KR | 101416388 B1 | 7/2014 | | |
| WO | WO 2008/022874 A1 | 2/2008 | | |
| WO | WO 2009/012568 A1 | 1/2009 | | |
| WO | WO 2017/134571 A1 | 8/2017 | | |

OTHER PUBLICATIONS

PCT/CN2018/110605, Jan. 4, 2019, International Search Report and Written Opinion.
First Office Action for Chinese Application No. 201880067550.1, dated May 19, 2021.
Extended European Search Report for European Application No. 18869850.0, dated Jun. 30, 2021.
Office Action for Korean Application No. 10-2020-7010720, dated Jul. 12, 2021.

* cited by examiner

HEAT EXCHANGE DEVICE WITH SHAPE MEMORY ALLOY SPRING

This Application is a national stage filing under 35 U.S.C. § 371 of International Patent Application Serial No. PCT/CN2018/110605, filed Oct. 17, 2018, which claims priority to Chinese patent application No. 201710992920.X, titled "HEAT EXCHANGE DEVICE", filed with the China National Intellectual Property Administration on Oct. 23, 2017. The contents of these applications are incorporated herein by reference in their entirety.

FIELD

The present application relates to the technical field of heat exchange, and in particular to a heat exchange device.

BACKGROUND

The heat exchange device can realize heat transfer between two mediums, which is mainly used in a system that requires a temperature regulation of working fluid in the system, so as to control the temperature of the working fluid in the system to be in a normal temperature range to meet the normal working requirements of the system.

For a vehicle, the normal lubrication of vehicle working parts by lubricating oil is the key to the safe traveling of the vehicle. When the vehicle is traveling normally, the lubricating oil can usually meet the lubrication requirements of the vehicle. However, when the vehicle is overloaded or traveling over snow or off-road in a four-wheel drive mode, the vehicle is traveling under a condition where the hydraulic torque converter is overly slipping, which may cause overly high temperature of the gearbox, resulting in reduced lubricating performance of the lubricating oil.

The temperature regulation function is mainly realized by a cooling flow path composed of a thermostatic valve and an external cooling device. A heat exchanger is usually used to cool the gearbox oil, so as to maintain the temperature of the gearbox oil within a certain working temperature range. The thermostatic valve usually controls the flow paths of lubricating oil or coolant with thermal actuators to achieve the purpose of switching fluid flow paths.

SUMMARY

A heat exchange device is provided according to the present application, which includes a heat exchanger body and a thermostatic assembly. The heat exchanger body includes a heat dissipation assembly, a fluid inlet, a fluid outlet, a heat exchange passage, and a bypass passage, and the heat dissipation assembly is provided with the heat exchange passage.

The heat exchanger body further includes a first passage, one end of the first passage is in communication with the fluid inlet, and the thermostatic assembly is arranged in the first passage. The thermostatic assembly includes a valve body provided with a valve chamber, the valve body is provided with an inlet, a first outlet, and a second outlet which are all in communication with the valve chamber, and external fluid flows into the heat exchanger body through the inlet of the valve body. A return spring, a shape memory alloy spring, and a valve sleeve are provided in the valve chamber, the valve sleeve is slidable back and forth in an axial direction the shape memory alloy spring is made of a memory alloy material, and the return spring and the shape memory alloy spring are respectively located on two sides of the valve sleeve.

In a case where the temperature is lower than a predetermined temperature, the elastic function of the shape memory alloy spring is disabled, and under the action of the return spring, the valve sleeve is at a first position, and the inlet communicates with the bypass passage through the second outlet.

In a case where the temperature is greater than or equal to the predetermined temperature, the elastic potential energy of the shape memory alloy spring is activated, and the elastic force of the shape memory alloy spring is greater than an elastic force of the return spring, and under the action of the elastic force difference between the shape memory alloy spring and the return spring, the valve sleeve slides to a second position to close the second outlet, the first outlet is in communication with the heat exchange passage, and the inlet is in communication with the heat exchange passage through the first outlet.

In a case where the temperature of the fluid flowing into the valve chamber is greater than or equal to the predetermined temperature, the elastic potential energy of the shape memory alloy spring is activated, that is, the shape memory alloy spring becomes elastic, and the elastic force of the shape memory alloy spring is greater than the elastic force of the return spring, that is, the elastic force of the shape memory alloy spring applied on the valve sleeve is greater than the elastic force of the return spring applied on the valve sleeve, the valve sleeve closes the second outlet and opens the first outlet under the action of the elastic force difference, and at this time, the inlet communicates with the first outlet and the heat exchange passage through the passage provided on the valve sleeve.

In a case where the temperature of the fluid drops below the predetermined temperature, the shape memory alloy spring loses the elasticity, the valve sleeve closes the first outlet and opens the second outlet under the return force of the return spring, and the inlet is in communication with the bypass passage again.

According to the present application, the thermal response of the shape memory alloy spring in the thermostatic assembly is fast, the response time is short, the structure of the thermostatic assembly can be simplified, and the thermostatic assembly can be installed to a plate heat exchanger to reduce the space occupation in the vehicle, which are beneficial to optimizing the overall design of the vehicle.

Figure 1:
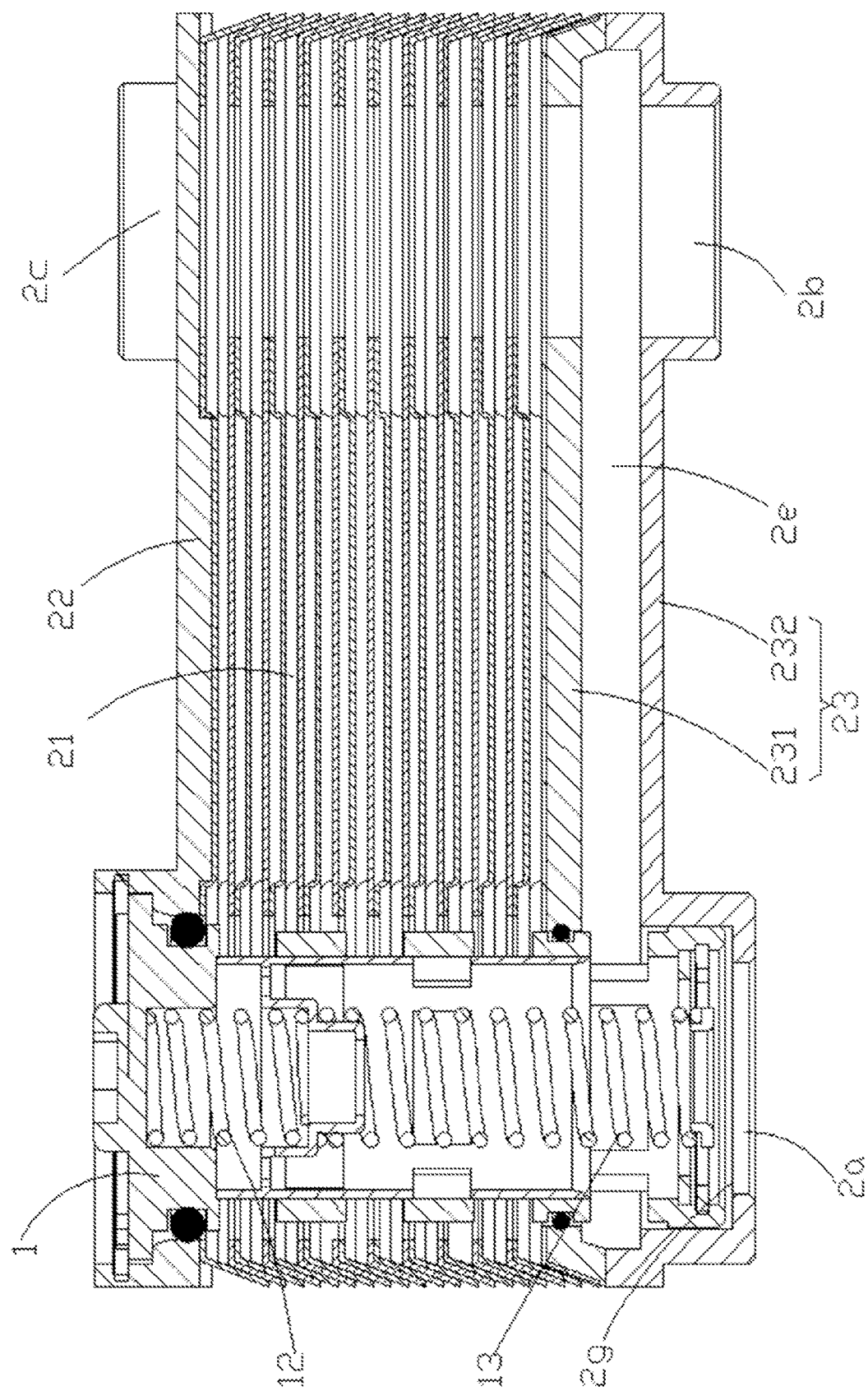
FIG. 1 is a schematic sectional view of a heat exchange device in a low temperature operating state according to an embodiment of the present application.

Reference numerals in FIGS. 1 to 6:

| | |
|---|---|
| 1 thermostatic assembly, | 10 valve body, |
| 10c inlet, | 10a first outlet, |
| 10b second outlet, | 11 valve sleeve, |
| 11a passage, | 111 support plate, |
| 1111 first shaft section, | 1112 second shaft section, |
| 12 shape memory alloy spring, | 13 return spring, |
| 14 valve seat, | 15 first sealing ring, |
| 16 second sealing ring, | 17 retaining ring, |
| 18 snap ring; | |
| 2 heat exchanger body, | 2a fluid inlet, |
| 2b fluid outlet, | 2c refrigerant inlet, |
| 2d refrigerant outlet, | 2e bypass passage, |
| 2f heat exchange passage, | 2g first passage, |
| 21 heat dissipation assembly, | 22 upper mounting plate, |
| 22a annular mounting seat, | 23 lower mounting plate, |
| 231 inner mounting plate, | 232 outer mounting plate. |
| 10' valve chamber, | 14' valve port, |
| 111' through hole, | |
| 22' and 23' coaxial mounting through holes. | |

DETAILED DESCRIPTION OF THE EMBODIMENTS

For the factors affecting the response speed of the thermostatic valve, a lot of research has been conducted according to the present application. It has been found by the research that, a thermal actuator of a thermostatic valve thermally expands and contracts according to the temperature of the fluid sensed by a heat sensitive substance. It takes a certain response time from the heat sensitive substance sensing the temperature to thermally expanding and contracting then to giving a spring force, that is, the response time of the thermal actuator is relatively slow, which causes a certain hysteresis in the temperature of the lubricating oil, seriously affects the performance of the transmission, and even causes damage to the transmission.

In addition, the size of the thermal actuator is large, and the thermal actuator needs to cooperate with the spring to switch the flow paths, so the size of the thermostatic valve is large. Therefore, when the thermostatic valve is installed to a system, the thermostatic valve usually needs to be connected to the heat exchanger through pipes on site. Installation space of a vehicle is generally small, so it is inconvenient to connect the thermostatic valve with the heat exchanger through pipes, and it is inconvenient to arrange the pipes and the heat exchanger. Moreover, the thermostatic valve further requires additional equipment for fixed installation.

In view of the above reasons, a technical problem to be urgently solved by those skilled in the art is how to improve the structure of the cooling system for cooling the gearbox oil.

In view of the above technical problem, further exploration has been conducted according to the present application, and a technical solution to the above technical problem is proposed, as described in detail below.

It should be noted that, terms such as "first" and "second" in this application are only for distinguishing components with the same or similar functions or structures and for concise description of the technical solution, rather than limitation on the sequence.

To provide those skilled in the art with a better understanding of the technical solution of the present application, the present application is further described below in detail with reference to the drawings and specific embodiments.

Figure 2:
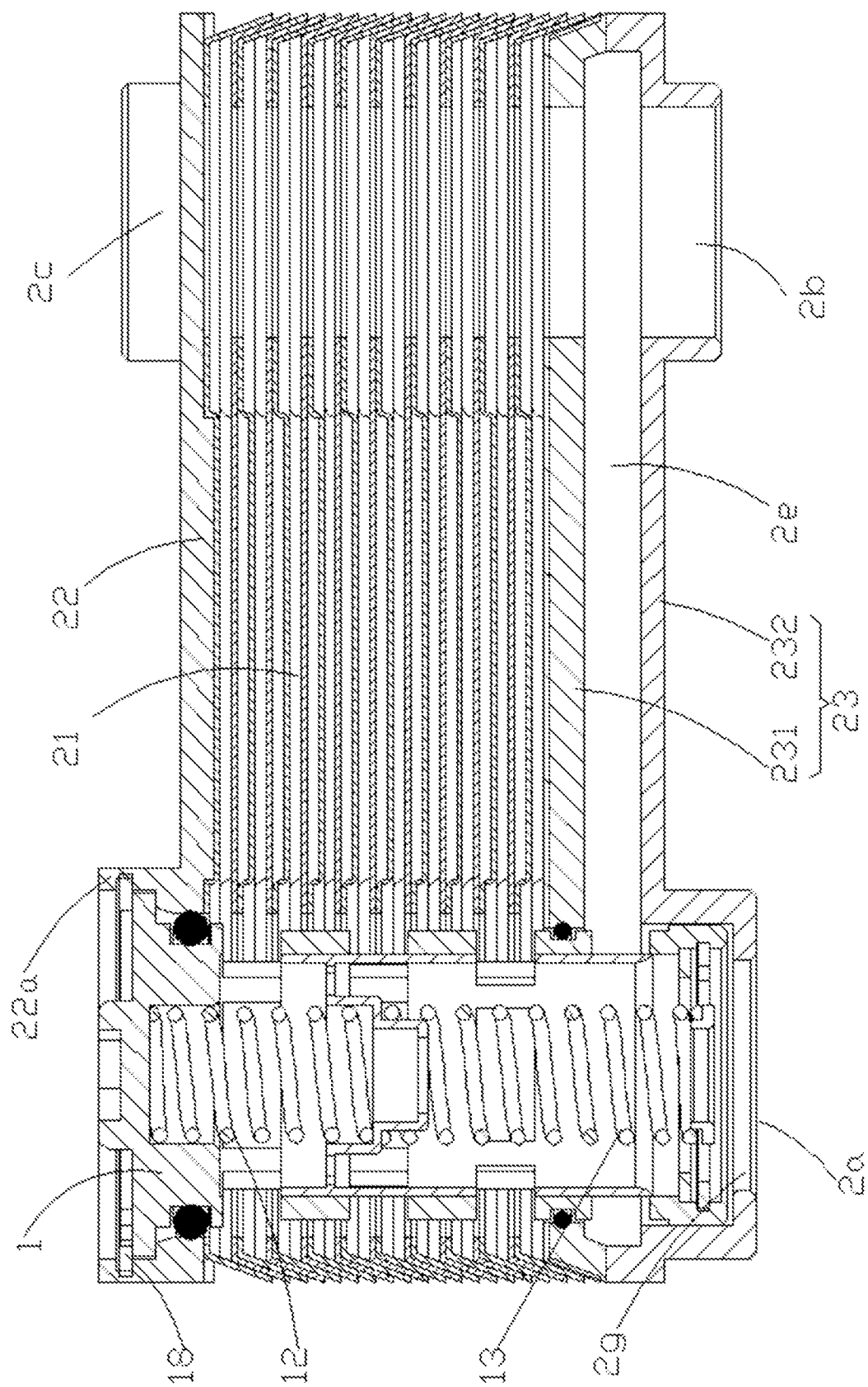
FIG. 2 is a schematic sectional view of the heat exchange device in a high temperature operating state shown in FIG. 1.
Figure 3:
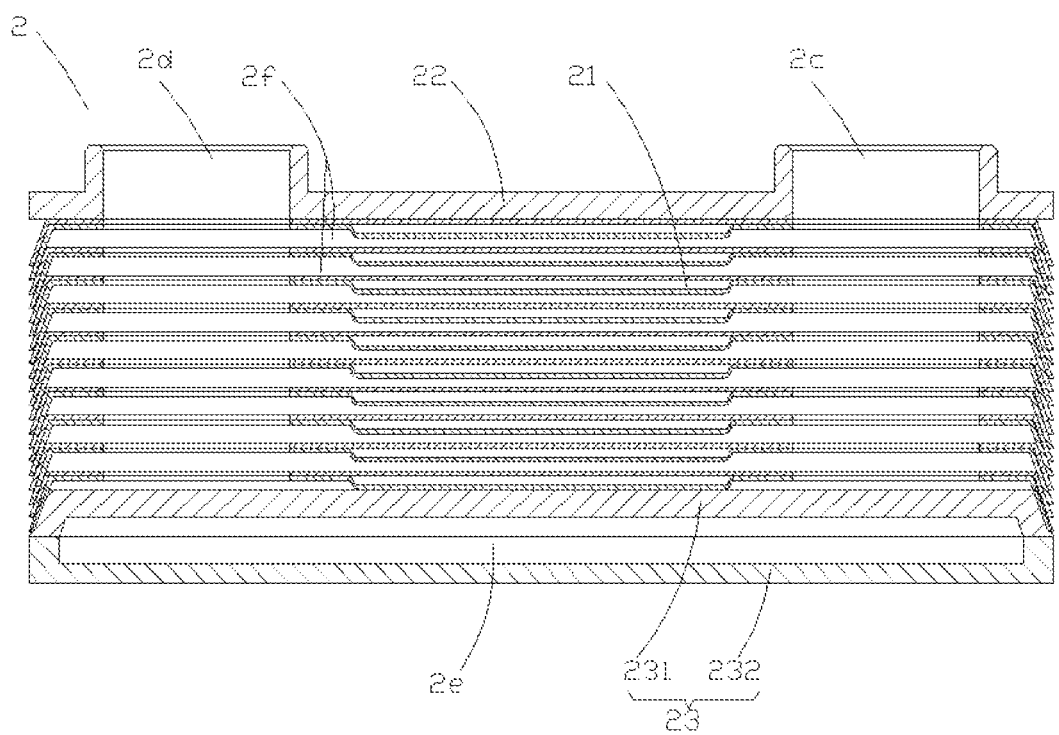
FIG. 3 is a schematic sectional view of the heat exchange device shown in FIG. 1 viewed from another direction.
Figure 4:
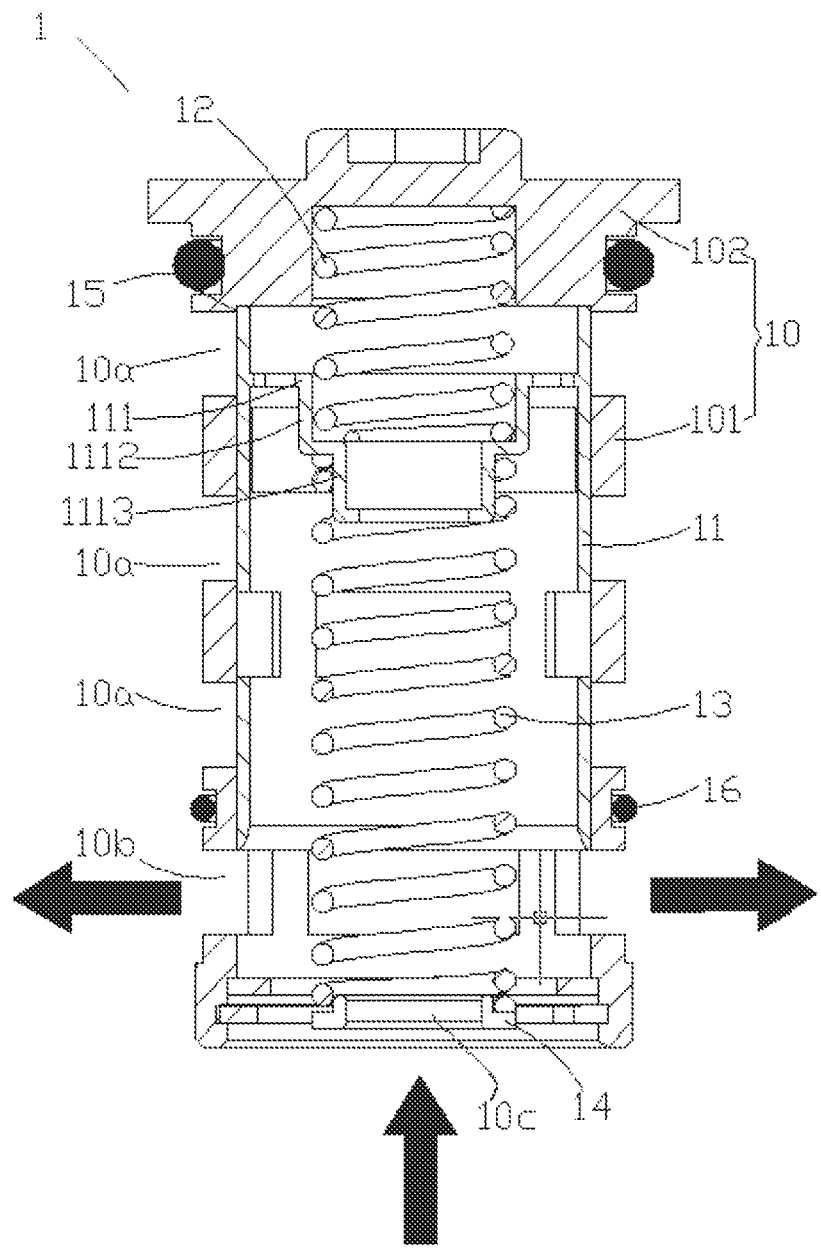
FIG. 4 is a schematic sectional view of a thermostatic assembly in the low temperature operating state according to an embodiment of the present application.
Figure 5:
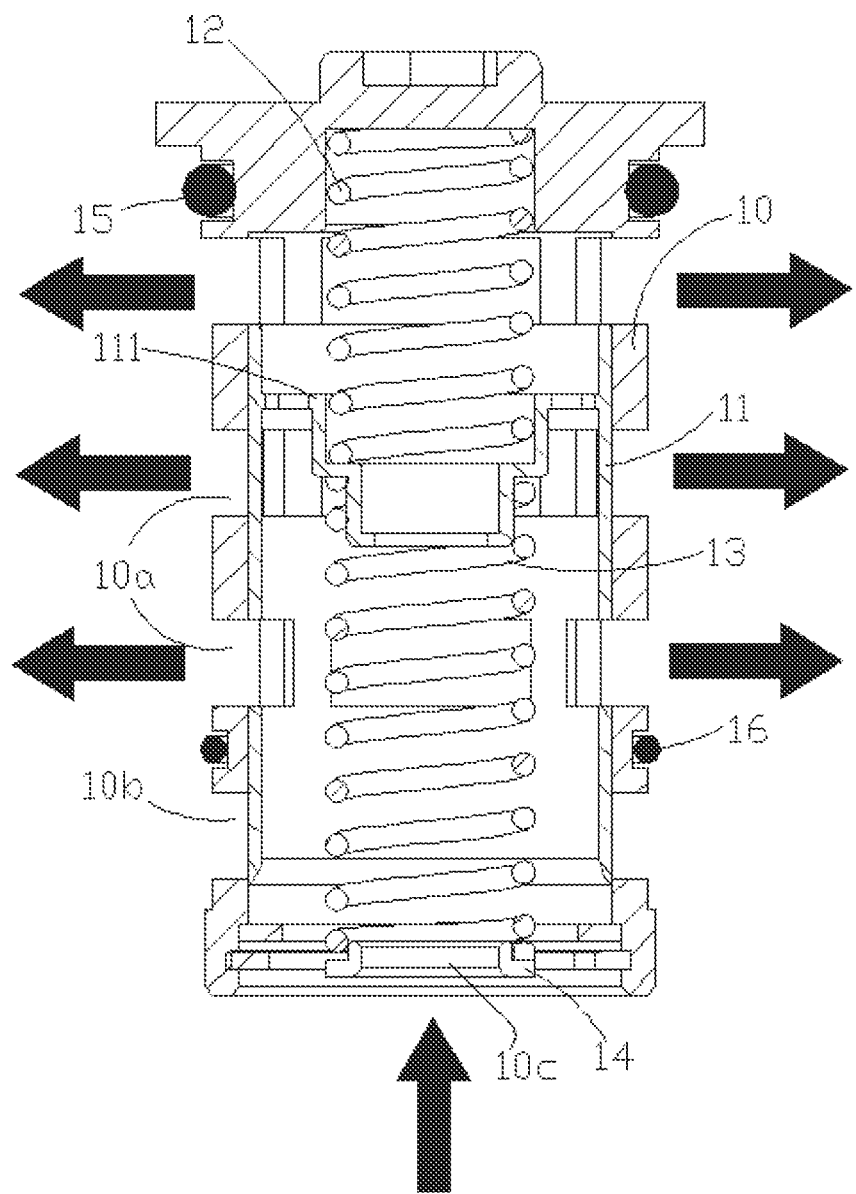
FIG. 5 is a schematic sectional view of the thermostatic assembly in the high temperature operating state shown in FIG. 4.
Figure 6:
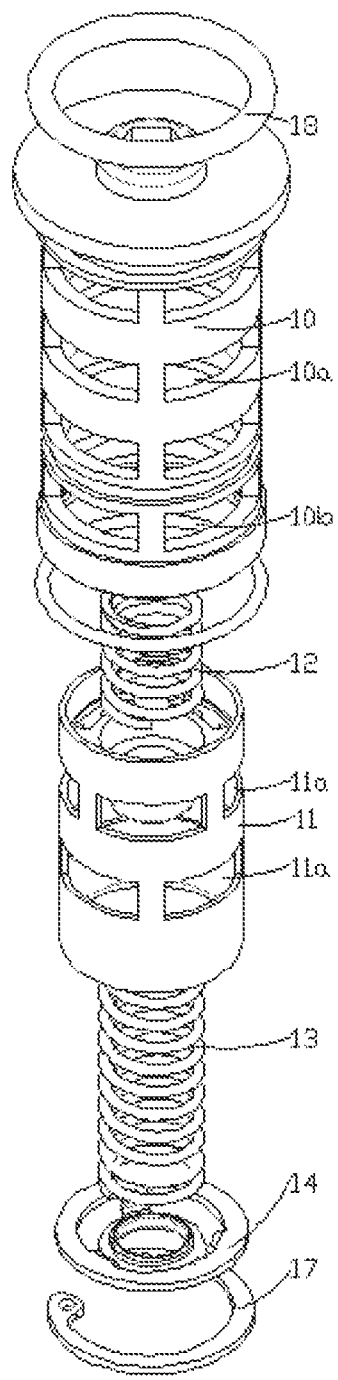
FIG. 6 is a schematic exploded view of the thermostatic assembly according to an embodiment of the present application.

Referring to FIGS. 1 to 6, FIG. 1 is a schematic sectional view of a heat exchange device in a low temperature operating state according to an embodiment of the present application; FIG. 2 is a schematic sectional view of the heat exchange device in a high temperature operating state shown in FIG. 1; FIG. 3 is a schematic sectional view of the heat exchange device shown in FIG. 1 viewed from another direction; FIG. 4 is a schematic sectional view of a thermostatic assembly in the low temperature operating state according to an embodiment of the present application; FIG. 5 is a schematic sectional view of the thermostatic assembly in the high temperature operating state shown in FIG. 4; and FIG. 6 is a schematic exploded view of the thermostatic assembly according to an embodiment of the present application.

The heat exchange device according to the present application includes a heat exchanger body 2 and a thermostatic assembly 1. The heat exchanger body 2 includes a heat dissipation assembly 21, a fluid inlet 2a, a fluid outlet 2b, a heat exchange passage 2f, and a bypass passage 2e. The fluid inlet 2a and the fluid outlet 2b in the present application may be connected with external gearbox oil pipelines to form a circulation loop, or may be connected to refrigerant pipelines to form a circulation refrigerant loop. By way of an example, the fluid inlet 2a and the fluid outlet 2b are connected with the gearbox oil pipelines to form a circulation loop in the present application to introduce the technical solution and technical effects. Apparently, the heat exchanger body 2 inevitably further includes a refrigerant inlet 2c and a refrigerant outlet 2d. The refrigerant inlet 2c and the refrigerant outlet 2d may be provided on a same side of the heat dissipation assembly 21, and the heat dissipation assembly 21 is provided with a refrigerant flow passage and an oil flow passage, so as to allow the gearbox oil and the refrigerant to complete the heat exchange inside the heat dissipation assembly 21 and to cool the oil. The refrigerant and the oil may flow in opposite direction to exchange heat. The refrigerant and the oil after passing through the heat dissipation assembly 21 flow out from the fluid outlet 2b and the oil outlet, respectively.

The heat exchanger body 2 may have various forms, for example, a plate heat exchanger, that is, the heat dissipation assembly 21 includes multiple plates arranged in parallel, and a fluid passage or a refrigerant passage is formed between adjacent plates. After the refrigerant and the oil flow through all the plates in turn, the refrigerant and the oil complete energy exchange. Apparently, the heat exchanger body 2 may be a heat exchanger of a sleeve-type structure or other structure.

To further introduce the technical solution and technical effects, the heat exchanger body 2 takes a plate heat exchanger as an example in the present application.

In the present application, the heat exchange passage 2f and the bypass passage 2e of the heat exchanger body 2 are independent of each other, and both are in communication with the fluid inlet 2a and the fluid outlet 2b, that is, the external fluid may flow from the fluid inlet 2a to the fluid outlet 2b through the heat exchange passage 2f, or may flow to the fluid outlet 2b through the bypass passage 2e. The heat exchange passage 2f according to the present application is formed in the heat dissipation assembly 21, that is, the fluid conducts heat exchange with the refrigerant while the fluid passes through the heat exchange passage 2f.

The bypass passage 2e according to the present application does not pass through the heat dissipation assembly 21, that is, after flowing in through the fluid inlet 2a, the fluid does not need to undergo heat exchange by the heat dissipation assembly 21, but flows to the fluid outlet 2b through the bypass passage 2e.

The heat exchanger body in the present application further includes a first passage 2g, and one end of the first passage 2g is in communication with the fluid inlet. Preferably, the first passage 2g is a pipe section close to the fluid inlet 2a. The thermostatic assembly 1 is arranged in the first passage 2g of the heat exchanger body 2. The thermostatic assembly 1 includes a valve body 10 provided with a valve chamber 10'. The valve body 10 is provided with an inlet 10c, a first outlet 10a, and a second outlet 10b which are all in communication with the valve chamber 10'.

The external fluid flows into the heat exchanger body 2 through the inlet of the valve body 10, that is, the external fluid flows into the valve chamber 10' from the inlet of the valve body 10, and then flows into the heat exchange passage 2f or the bypass passage 2e inside the heat exchanger body 2 through the first outlet 10a or the second outlet 10b.

The valve body 10 according to the present application is further provided with a return spring 13, a shape memory alloy spring 12 and a valve sleeve 11 which is slidable back and forth in an axial direction. The valve sleeve 11 is hermetically slidable relative to the valve chamber 10' in the axial direction. The return spring 13 and the shape memory alloy spring 12 are located on two sides of the valve sleeve 11 in the axial direction, two ends of the return spring 13 are respectively supported on the valve body 10 and the valve sleeve 11, and two ends of the shape memory alloy spring 12 are respectively supported on the valve body 10 and the valve sleeve 11.

It needs to be explained is that, the shape memory alloy spring 12 herein is made of a memory alloy material (Shape Memory Alloys, SMA for short), also known as a shape memory alloy spring. Once the memory alloy material is activated, as the temperature increases, the longer the extension length of the shape memory alloy spring 12, the greater the elastic potential energy. The shape memory alloy spring 12 may be made of Nickel-Titanium (Ni—Ti) alloy.

The SMA spring responds extremely fast, and the instantaneous temperature exceeding value can be controlled below 2 Celsius degrees. Moreover, the response of the SMA spring near 40 Celsius degrees is extremely sensitive, which can meet the working temperature regulation requirements of the gearbox oil of the vehicle.

The first outlet 10a of the thermostatic assembly 1 is in communication with the first heat exchange passage 2f, and the second outlet 10b of the thermostatic assembly 1 is in communication with the bypass passage 2e.

In a case where the temperature is lower than a predetermined temperature, the elastic function of the shape memory alloy spring 12 is disabled, and under the action of the return spring 13, the valve sleeve 11 is at a first position, and the inlet is in communication with the second outlet 10b.

In a case where the temperature is greater than or equal to the predetermined temperature, the elastic potential energy of the shape memory alloy spring 12 is activated, and the elastic force of the shape memory alloy spring 12 is greater than the elastic force of the return spring 13, and under the action of the elastic force difference between the shape memory alloy spring 12 and the return spring 13, the valve sleeve 11 slides to a second position to close the second outlet 10b, the first outlet 10a is in communication with the heat exchange passage 2f, and the inlet is in communication with the heat exchange passage 2f through the first outlet 10a.

When the heat exchange device according to the present application is in use, the fluid inlet 2a is connected to the oil outlet of the gearbox, and the fluid outlet 2b is connected to the oil outlet of the gearbox. The oil flowing into the fluid inlet 2a of the heat exchanger body 2 first flows into the valve chamber 10' of the valve body 10. In a case where the temperature of the oil is lower than the predetermined temperature, the shape memory alloy spring 12 is inelastic, the valve sleeve 11 is at the first position only by the action of the return spring 13, the second outlet 10b is in communication with the bypass passage 2e, and in this case, the oil flowing into the valve chamber 10' flows out through the second outlet 10b, the bypass passage 2e, and the fluid outlet 2b, without heat exchange with the refrigerant by the heat dissipation assembly 21. That is, the temperature of the oil is relatively low in this case, and no cooling is required.

It should be noted that, since the internal resistance of the bypass passage 2e is much smaller than the internal resistance of the heat exchange passage 2f, most of the oil in the chamber flows to the bypass passage 2e only through the second outlet 10b, even if the first outlet 10a is in communication with the inlet in this case. That is, in a case where the requirement on the internal leakage is not high, the first outlet 10a may not be completely closed or may be in an open state, as long as the second outlet is open. Since the fluid resistance of the fluid passing through the bypass passage 2e is much smaller than the fluid resistance of the fluid passing through the heat exchange passage 2f, most of the fluid passes through the bypass passage 2e, which can also meet the functional requirements of the normal operation of the vehicle.

In a case where the temperature of the oil flowing into the valve chamber 10' is greater than or equal to the predetermined temperature, the elastic potential energy of the shape memory alloy spring 12 is activated, that is, the shape memory alloy spring 12 becomes elastic, and the elastic force of the shape memory alloy spring 12 is greater than the elastic force of the return spring 13, that is, the elastic force of the shape memory alloy spring 12 applied on the valve sleeve 11 is greater than the elastic force of the return spring 13 applied on the valve sleeve 11, the valve sleeve 11, under the action of the elastic force difference, moves along the axial direction, and fully closes the second outlet 10b when the valve sleeve 11 reaches the second position, the first outlet 10a is in communication with the heat exchange passage 2f, and at this time, the inlet is in communication with the first outlet 10a and the heat exchange passage 2f through the passage 11a provided on the valve sleeve 11. In this way, the oil flowing inside through the inlet flows into the heat exchange passage 2f through the first outlet 10a, conducts heat exchange with the refrigerant while flowing through the heat exchange passage 2f, and finally flows out from the fluid outlet 2b.

In a case where the temperature of the oil in the system drops below the predetermined temperature after being cooled by the heat dissipation assembly, the shape memory alloy spring 12 loses the elasticity, the valve sleeve 11 under the return force of the return spring 13, axially moves to the first position again, the first outlet 10a is closed, the second outlet 10b is opened, and the inlet is in communication with the bypass passage 2e again.

In the present application, the thermal response of the shape memory alloy spring 12 in the thermostatic assembly 1 is fast, the response time is short, which greatly improve the performance and safety of the transmission. In addition, the shape memory alloy spring 12 has a small size, the installation stability is relatively high, and the shape memory alloy spring does not need to be used in conjunction with other components, which simplifies the structure of the thermostatic assembly 1 and greatly reduces the size of the thermostatic assembly 1. The thermostatic assembly 1 may be installed at a fluid inlet of a plate heat exchanger, and the two are integrally designed, which does not need on-site installation, improves installation efficiency, greatly reduce the space occupation in the vehicle, and is beneficial to optimizing the overall design of the vehicle.

Specifically, the valve body 10 may be a hollow cylinder 101 having a closed end 102 at one end and an open end at another end, and an inner cavity of the hollow cylinder 101 forms the valve chamber 10'. A valve seat 14 is provided at the opening of the hollow cylinder 101. The valve seat 14 is provided with a valve port 14', the inlet 10c is in communication with the valve chamber 10' through the valve port 14', and the oil from the inlet enters the valve chamber 10' through the valve port 14'. The two ends of the return spring 13 are respectively supported on the valve seat 14 and the valve sleeve 11.

The valve seat 14 may be fixed at the inlet of the valve body 10 by a component such as a retaining ring 17.

In a specific embodiment, the valve sleeve 11 is a cylinder with two open ends. An inner circumferential surface of the cylinder is provided with a support plate 111 extending inward. The valve chambers on two sides of the support plate 111 are in communication with each other, that is, the support plate 111 divides the inner cavity of the cylinder into an upper cylinder and a lower cylinder which are in communication with each other. The two ends of the shape memory alloy spring 12 are respectively supported on a closed end 102 and one end of the support plate 111, and the two ends of the return spring 13 are respectively supported on the other end of the support plate 111 and the valve seat 14.

In the above arrangement, the shape memory alloy spring 12 is located inside the upper cylinder. Since the upper cylinder is in communication with the lower cylinder, part of the oil flowing in from the inlet of the valve body 10 can quickly flow into the upper cylinder, which is beneficial to improving the quick response of the shape memory alloy spring 12.

In order to improve the installation stability of the shape memory alloy spring 12 and the return spring 13, a detailed design of the structure of the support plate 111 is provided according to the present application.

In a specific embodiment, the support plate 111 includes an annular body, and an inner edge of the annular body extends in the axial direction to form two hollow shaft sections with different diameters. A stepped surface is formed between the two hollow shaft sections, and the return spring 13 and the shape memory alloy spring 12 are respectively supported on the inner and outer sides of the stepped surface.

The shaft sections formed by axial extension may extend upward or downward. Hollow shaft sections that extend downward are provided herein. Two shaft sections with different diameters herein are defined as a first shaft section 1111 and a second shaft section 1112. The diameter of the first shaft section 1111 is greater than the diameter of the second shaft section 1112. A lower end of the shape memory alloy spring 12 is accommodated in the inner cavity of the first shaft section 1111 and is supported on an upper end surface of the stepped surface. An upper end of the return spring 13 is sleeved on the second shaft section 1112 and is supported on a lower end of the stepped surface.

The first shaft section 1111 and the second shaft section 1112 function as a spring mount seat, which increases the stability of installation and movement of the return spring 13 and the shape memory alloy spring 12.

The arrangement of the first outlet 10a and the second outlet 10b has various forms, and a specific arrangement is given below.

In each of the above embodiments, along the axial direction, multiple spaced-apart first outlets 10a are uniformly arranged on the shaft sections of the hollow cylinder 101 corresponding to the heat dissipation assembly 21. That is, in a circumferential direction, multiple first outlets 10a are provided, the first outlets 10a may be uniformly arranged in the circumferential direction, and the first outlets 10a may be arc-shaped openings. The structure of the valve sleeve 11 is designed according to the positions of the first outlets 10a opened on the valve body 10. Theoretically, the first outlets 10a are blocked, when the valve sleeve 11 is at the first position, and the second outlet 10b is opened when the valve sleeve 11 is at the second position.

The support plate 111 is provided with at least one through hole 111' for communicating the inlet with the corresponding first outlet 10a located above the support plate 111. The support plate 111 is located approximately in the middle of the valve sleeve 11. The annular body may be provided with multiple through holes 111' along the circumferential direction, and the hollow shaft section formed by the annular body may be a hollow cylinder with two open ends.

As described above, the heat dissipation assembly 21 may include multiple plate bodies arranged in parallel, the heat exchanger body 2 further includes an upper mounting plate 22 and a lower mounting plate 23, and each of the plate bodies are arranged between the two mounting plates. The two mounting plates and each of the plate bodies are provided with coaxial mounting through holes 22' and 23', the valve body 10 is inserted in the mounting through holes 22' and 23', the closed end 102 of the valve body 10 is hermetically fixed to the upper mounting plate 22 in the circumferential direction, and the valve body 10 is circumferentially sealed to the lower mounting plate 23. The bypass passage 2e is formed inside the lower mounting plate 23. The fluid inlet 2a and the fluid outlet 2b of the heat exchanger body 2 are both opened in an outer mounting plate 232.

Apparently, the bypass passage 2e may be formed inside the upper mounting plate 22, and correspondingly, the second outlet 10b on the valve body 10 is provided on the upper shaft section of the valve body 10.

It should be noted that, the upper and lower positional relationships herein are described with reference to the relative positional relationships between the components in FIG. 1, which are only for the concise description of the technical solution, and facilitate the understanding of the technical solution by those skilled in the art. Those skilled in the art should understand that the use of orientation words herein does not limit the scope of protection of the present application.

In order to facilitate processing of the bypass passage 2e of the lower mounting plate 23, further, the lower mounting plate 23 according to the present application may include an inner mounting plate 231 and an outer mounting plate 232. The heat dissipation assembly 21 is mounted on an upper surface of the inner mounting plate 231, and the inner mounting plate 231 and the outer mounting plate 232 together define the bypass passage 2e. The valve body 10 is circumferentially sealed to the inner mounting plate 231 and the outer mounting plate 232.

The valve body 10 may be circumferentially sealed to the upper mounting plate 22 and the lower mounting plate 23 by sealing rings. As shown, a first sealing ring 15 is provided between the valve body 10 and the upper mounting plate 22, and a second sealing ring 16 is provided between the valve body 10 and the inner mounting plate 231.

The mounting through hole 22' of the upper mounting plate 22 protrudes upward in the circumferential direction to form an annular mounting seat 22a. The heat exchange device further includes a snap ring 18 provided in the annular mounting seat 22a. The snap ring 18 abuts against an outer end of the closed end to fix the valve body 10 to the upper mounting plate 22. That is, a snap groove is provided in a circumferential wall of the annular mounting seat 22a, and the snap ring 18 is installed inside the snap groove to restrict the valve body 10 from moving outward.

In the above embodiments, when the valve sleeve 11 just completely closes the second outlet 10b, there is a predetermined distance between a lower end surface of the valve sleeve 11 and the valve seat 14. Maintaining a certain distance between the valve sleeve 11 and the valve seat 14 can act as a buffer. When the temperature of the lubricating oil is too high, the shape memory alloy spring 12 further expands and pushes the valve sleeve 11 to further move downward for a certain distance, which is facilitated to avoiding damage to the thermostatic assembly 1 due to excessive expansion of the shape memory alloy spring 12.

In the above embodiments, the valve sleeve 11 may be circumferentially fitted with the valve chamber 10', and may be slidable with respect to the valve chamber 10' in a sealed way. Cross sections of the valve sleeve 11 and the valve chamber 10' may be circular or of other shapes.

The heat exchange device according to the present application has been described in detail above. Specific examples are used herein to explain the principles and embodiments of the present application, and the description of the above embodiments is only intended to facilitate understanding the method and core ideas of the present application. It should be noted that, for those of ordinary skill in the art, improvements and modifications can be made to the present application without departing from the principles of the present application, and these improvements and modifications shall also fall within the protection scope of the claims of the present application.

The invention claimed is:

1. A heat exchange device, comprising a heat exchanger body and a thermostatic assembly, wherein the heat exchanger body comprises a fluid inlet, a fluid outlet, and a bypass passage, and the heat exchanger body further comprises a heat dissipation assembly, and the heat dissipation assembly is provided with a heat exchange passage;

the heat exchanger body further comprises a first passage, one end of the first passage is in communication with the fluid inlet, at least part of the thermostatic assembly is arranged in the first passage, the thermostatic assembly comprises a valve body provided with a valve chamber, the valve body is provided with an inlet, a first outlet, and a second outlet which are all in communication with the valve chamber; a return spring, a shape memory alloy spring, and a valve sleeve are provided in the valve chamber, the valve sleeve is slidable back and forth in an axial direction, the shape memory alloy spring is made of a memory alloy material, and the return spring and the shape memory alloy spring are respectively located on two sides of the valve sleeve;

in a case where the temperature is lower than a predetermined temperature, an elastic function of the shape memory alloy spring is disabled, and under an action of the return spring, the valve sleeve is at a first position, and the inlet is in communication with the bypass passage through the second outlet; and in a case where the temperature is greater than or equal to the predetermined temperature, and a first elastic force of the shape memory alloy spring is greater than a second elastic force of the return spring, and under an action of the difference between the first elastic force of the shape memory alloy spring and the second elastic force of the return spring, the valve sleeve slides to a second position to close the second outlet, the first outlet is in communication with the heat exchange passage, and the inlet is in communication with the heat exchange passage through the first outlet.

2. The heat exchange device according to claim 1, wherein, the valve body is a hollow cylinder having a closed end at one end and an open end at another end, a valve seat is provided at the open end of the hollow cylinder, the valve seat is provided with a valve port, the inlet is in communication with the valve chamber through the valve port, and two ends of the return spring are respectively supported on the valve seat and the valve sleeve.

3. The heat exchange device according to claim 2, wherein, the heat dissipation assembly comprises a plurality of plate bodies arranged in parallel, the heat exchanger body further comprises an upper mounting plate and a lower mounting plate, and each of the plurality of plate bodies is arranged between the two mounting plates; the two mounting plates and the corresponding plate body are provided with coaxial mounting through holes, the valve body is inserted inside the mounting through holes, the closed end of the valve body is hermetically fixed to the upper mounting plate in a circumferential direction, and the valve body is circumferentially sealed to the lower mounting plate; and the bypass passage is formed inside the lower mounting plate.

4. The heat exchange device according to claim 3, wherein, the lower mounting plate comprises an inner mounting plate and an outer mounting plate, the heat dissipation assembly is mounted on an upper surface of the inner mounting plate, and the inner mounting plate and the outer mounting plate are peripherally sealed to form the bypass passage; and the fluid inlet and the fluid outlet of the heat exchanger body are both opened on the outer mounting plate.

5. The heat exchange device according to claim 3, wherein, the mounting through hole of the upper mounting plate protrudes upward in the circumferential direction to form an annular mounting seat, the heat exchange device further comprises a snap ring provided in the annular mounting seat, and the snap ring abuts against an outer end of the closed end to fix the valve body to the upper mounting plate.

6. The heat exchange device according to claim 2, wherein, when the valve sleeve just completely closes the second outlet, a predetermined distance is reserved between a lower end surface of the valve sleeve and the valve seat.

7. The heat exchange device according to claim 2, wherein, an outer peripheral wall of the valve sleeve is slidable with respect to the valve chamber in a sealed way.

8. The heat exchange device according to claim 2, wherein, the valve sleeve is a cylinder with two open ends, a support plate extending inward is provided on an inner circumferential surface of the cylinder, the valve chambers on two sides of the support plate are in communication with each other, the shape memory alloy spring are has been replaced with the shape memory alloy spring is supported between the closed end and one end of the support plate, and the return spring is supported between the other end of the support plate and the valve seat.

9. The heat exchange device according to claim 8, wherein, the support plate comprises an annular body, an inner edge of the annular body extends in the axial direction to form two hollow shaft sections, and the two hollow shaft sections have different diameters so as to form a stepped surface, and the return spring and the shape memory alloy spring are respectively supported on inner and outer sides of the stepped surface.

10. The heat exchange device according to claim 9, wherein, the heat dissipation assembly comprises a plurality of plate bodies arranged in parallel, the heat exchanger body further comprises an upper mounting plate and a lower mounting plate, and each of the plurality of plate bodies is arranged between the two mounting plates; the two mounting plates and the corresponding plate body are provided with coaxial mounting through holes, the valve body is inserted inside the mounting through holes, the closed end of the valve body is hermetically fixed to the upper mounting plate in a circumferential direction, and the valve body is circumferentially sealed to the lower mounting plate; and the bypass passage is formed inside the lower mounting plate.

11. The heat exchange device according to claim 9, wherein, when the valve sleeve just completely closes the second outlet, a predetermined distance is reserved between a lower end surface of the valve sleeve and the valve seat.

12. The heat exchange device according to claim 8, wherein, along the axial direction, a plurality of spaced-apart first outlets are uniformly arranged on shaft sections of the hollow cylinder corresponding to the heat dissipation assembly, part of the plurality of first outlets are located above the support plate, and the support plate is provided with at least one through hole for communicating the inlet with the corresponding first outlet located above the support plate.

13. The heat exchange device according to claim 12, wherein, the heat dissipation assembly comprises a plurality of plate bodies arranged in parallel, the heat exchanger body further comprises an upper mounting plate and a lower mounting plate, and each of the plurality of plate bodies is arranged between the two mounting plates; the two mounting plates and the corresponding plate body are provided with coaxial mounting through holes, the valve body is inserted inside the mounting through holes, the closed end of the valve body is hermetically fixed to the upper mounting plate in a circumferential direction, and the valve body is circumferentially sealed to the lower mounting plate; and the bypass passage is formed inside the lower mounting plate.

14. The heat exchange device according to claim 12, wherein, when the valve sleeve just completely closes the second outlet, a predetermined distance is reserved between a lower end surface of the valve sleeve and the valve seat.

15. The heat exchange device according to claim 8, wherein, the heat dissipation assembly comprises a plurality of plate bodies arranged in parallel, the heat exchanger body further comprises an upper mounting plate and a lower mounting plate, and each of the plurality of plate bodies is arranged between the two mounting plates; the two mounting plates and the corresponding plate body are provided with coaxial mounting through holes, the valve body is inserted inside the mounting through holes, the closed end of the valve body is hermetically fixed to the upper mounting plate in a circumferential direction, and the valve body is circumferentially sealed to the lower mounting plate; and the bypass passage is formed inside the lower mounting plate.

16. The heat exchange device according to claim 8, wherein, when the valve sleeve just completely closes the second outlet, a predetermined distance is reserved between a lower end surface of the valve sleeve and the valve seat.

17. The heat exchange device according to claim 8, wherein, an outer peripheral wall of the valve sleeve is slidable with respect to the valve chamber in a sealed way.

18. The heat exchange device according to claim 1, wherein, an outer peripheral wall of the valve sleeve is slidable with respect to the valve chamber in a sealed way.

* * * * *

UNITED STATES PATENT AND TRADEMARK OFFICE
CERTIFICATE OF CORRECTION

| | |
|---|---|
| PATENT NO. | : 11,402,012 B2 |
| APPLICATION NO. | : 16/649093 |
| DATED | : August 2, 2022 |
| INVENTOR(S) | : Haoming Qiu et al. |

It is certified that error appears in the above-identified patent and that said Letters Patent is hereby corrected as shown below:

In the Claims

Claim 8, at Column 11, Lines 6-7:
"the shape memory alloy spring are has been replaced with the shape memory alloy spring is"
Should read:
--the shape memory alloy spring is--

Signed and Sealed this
Eighteenth Day of October, 2022

Katherine Kelly Vidal
*Director of the United States Patent and Trademark Office*